United States Patent
Rodney

(10) Patent No.: US 9,465,128 B2
(45) Date of Patent: Oct. 11, 2016

(54) DRILLING DYNAMICS MONITOR

(75) Inventor: Paul F. Rodney, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 415 days.

(21) Appl. No.: 13/575,405

(22) PCT Filed: Jan. 27, 2011

(86) PCT No.: PCT/US2011/022755
§ 371 (c)(1),
(2), (4) Date: Jan. 24, 2013

(87) PCT Pub. No.: WO2011/094432
PCT Pub. Date: Aug. 4, 2011

(65) Prior Publication Data
US 2013/0113491 A1 May 9, 2013

Related U.S. Application Data

(60) Provisional application No. 61/336,801, filed on Jan. 27, 2010.

(51) Int. Cl.
*G01V 3/00* (2006.01)
*G01V 3/08* (2006.01)
*E21B 47/00* (2012.01)

(52) U.S. Cl.
CPC .............. *G01V 3/08* (2013.01); *E21B 47/00* (2013.01)

(58) Field of Classification Search
CPC ........ E21B 44/04; E21B 47/00; E21B 47/18; E21B 44/00; E21B 7/00; E21B 47/01; E21B 47/011; E21B 47/026; G01V 5/04; G01V 1/40; G01V 3/28; G01V 3/30; G01V 3/26; G01V 3/24; G01V 3/38; G01V 3/18; G01V 3/101; G01V 3/12; G01N 29/04; G01N 27/223; G01B 15/02
USPC .......... 73/152.43; 702/6, 7, 9; 324/332, 333, 324/338–340, 346
See application file for complete search history.

(56) References Cited

U.S. PATENT DOCUMENTS 3,813,656 A * 5/1974 Fowler ................. G01V 11/002
367/82
4,047,430 A * 9/1977 Angehrn .................... 73/152.02
(Continued)

FOREIGN PATENT DOCUMENTS

WO WO-2011094432 A1 8/2011

OTHER PUBLICATIONS

"International Application Serial No. PCT/US2011/022755, Search Report mailed Mar. 23, 2011", 4 pgs.
(Continued)

*Primary Examiner* — Son Le
*Assistant Examiner* — Thang Le
(74) *Attorney, Agent, or Firm* — Schwegman Lundberg & Woessner, P.A.; Alan Bryson

(57) ABSTRACT

Procedures are described for monitoring dynamics along a drill string during the drilling process using only surface instrumentation or using a combination of surface and downhole instrumentation. Events such as drill collar whirl may be identified from signatures found in signals generated by an electromagnetic sensor such as a magnetometer and/or from a mechanical sensor such as accelerometer. Additional embodiments are described.

15 Claims, 5 Drawing Sheets

(56) References Cited

U.S. PATENT DOCUMENTS

| | | | | |
|---|---|---|---|---|
| 4,954,998 | A * | 9/1990 | Rector | G01V 1/37 340/853.1 |
| 5,018,590 | A * | 5/1991 | Weldon | E21B 4/12 175/105 |
| 5,038,614 | A * | 8/1991 | Bseisu et al. | 73/592 |
| 5,321,981 | A * | 6/1994 | Macpherson | 73/152.43 |
| 5,339,036 | A * | 8/1994 | Clark | E21B 17/1078 175/50 |
| 5,818,352 | A * | 10/1998 | McClure | 340/854.6 |
| 6,023,658 | A * | 2/2000 | Jeffryes | E21B 47/18 702/16 |
| 6,205,851 | B1 * | 3/2001 | Jogi | 73/152.47 |
| 6,208,265 | B1 * | 3/2001 | Smith | G01V 3/12 340/853.1 |
| 6,825,659 | B2 * | 11/2004 | Prammer et al. | 324/303 |
| 7,268,696 | B2 * | 9/2007 | Rodney | G01V 11/002 340/854.6 |
| 8,749,399 | B2 * | 6/2014 | Petrovic | G01V 11/002 175/40 |
| 2003/0025639 | A1 * | 2/2003 | Rodney | G01V 11/002 343/719 |
| 2004/0124012 | A1 * | 7/2004 | Dunlop et al. | 175/57 |
| 2005/0179436 | A1 * | 8/2005 | Park | 324/344 |
| 2005/0197777 | A1 | 9/2005 | Rodney et al. | |
| 2005/0279532 | A1 | 12/2005 | Ballantyne et al. | |
| 2006/0122778 | A1 * | 6/2006 | Gao et al. | 702/7 |
| 2007/0278008 | A1 * | 12/2007 | Kuckes et al. | 175/40 |
| 2008/0164062 | A1 * | 7/2008 | Brackin et al. | 175/24 |
| 2009/0194332 | A1 * | 8/2009 | Pastusek et al. | 175/40 |
| 2012/0132418 | A1 * | 5/2012 | McClung, III | 166/250.12 |

OTHER PUBLICATIONS

"International Application Serial No. PCT/US2011/022755, Written Opinion mailed Mar. 23, 2011", 8 pgs.

* cited by examiner

DRILLING DYNAMICS MONITOR

RELATED APPLICATIONS

This application is a U.S. National Stage Filing under 35 U.S.C. 371 from International Application No. PCT/US2011/022755, filed on Jan. 27, 2011, and published as WO 2011/094432A1 on Aug. 4, 2011, which application claims priority to U.S. Provisional Application Ser. No. 61/336,801 filed on Jan. 27, 2010 which applications and publication are hereby incorporated by reference in their entirety.

BACKGROUND

Conventional techniques for monitoring dynamic modes along a drill string use sensors located along the drill string. These techniques also involve using systems that can obtain data from the distributed sensors, and then process the data to provide the dynamic monitoring. It would be desirable to obtain information regarding the dynamic state of a drill string, along the length of the drill string, without that complexity.

DETAILED DESCRIPTION

Described below are procedures for monitoring dynamics along a drill string during the drilling process using only surface instrumentation or using a combination of surface and downhole instrumentation. It is desirable to monitor variety of signals in order to establish reference signals for cancellation of noise in MWD (measurement while drilling) telemetry systems.

In analyzing noise acquired for creation of noise references for use with an electromagnetic telemetry system, a number of correlations have been observed between these noise sources and drilling dynamics. Electromagnetic waves, acoustic waves, and various drill string vibrational and torsional modes propagate at different speeds. In general, the vibrational and torsional modes typically propagate at much lower speeds than the electromagnetic or acoustic waves associated with them. In what follows, examples are provided of signals that can be correlated with drill string dynamic modes. Following that is a summary of an example procedure for identifying drilling dynamic behaviors and for identifying discrete events while drilling as well as identifying where along the drill string these events originate.

First Example

Identifying Whirl

Figure 1:
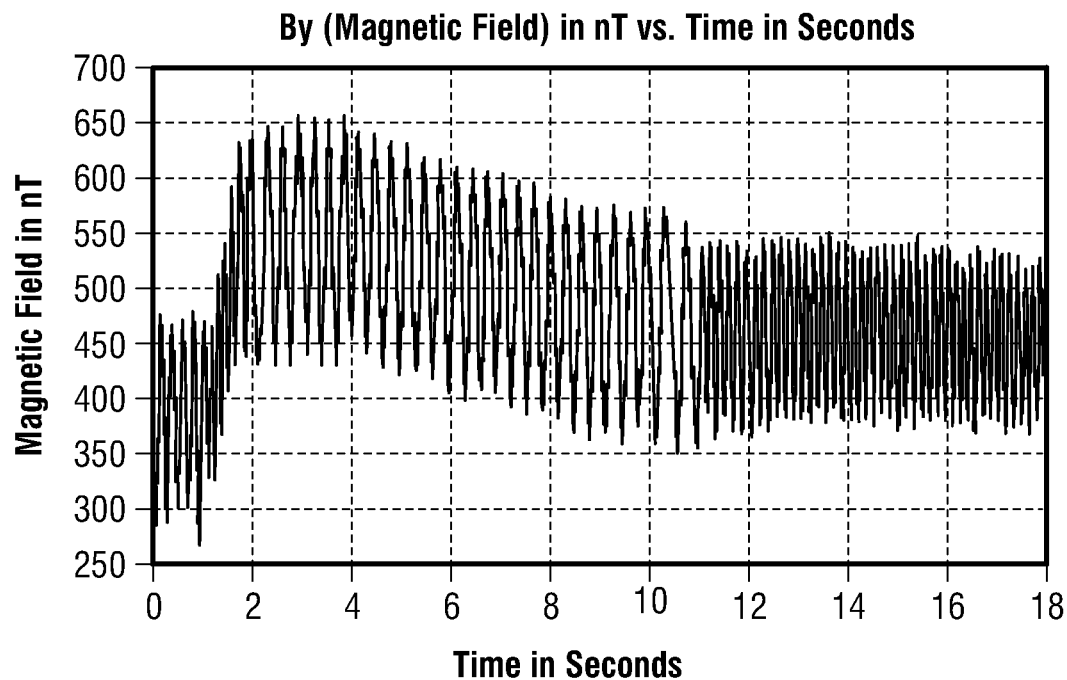
FIG. 1 shows an example of a magnetometer signal generated by a magnetometer mounted on the draw works of a drilling rig.
Figure 2:
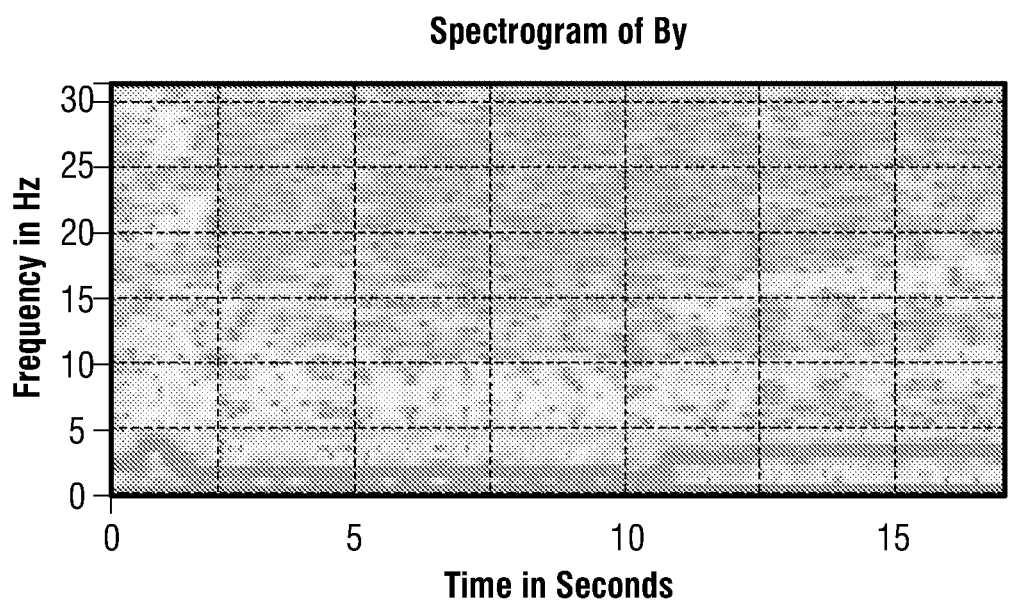
FIG. 2 shows a frequency spectrogram of the magnetometer signal of FIG. 1.

In drill collar whirl or casing whirl, one can expect to see frequency doubling as the severity of the whirl increases, and ultimately to see the whirl cross from systematic into chaotic motion. FIG. 1 depicts a signal from a magnetometer mounted on the draw works of a drilling rig. In this example, the signal was received at a time when both the electromagnetic telemetry transmitter at the surface and downhole were off (though this is not a requirement in any way), and the signal has been identified as associated with whirl. The signal is believed to result from contact of the drill pipe with the casing, thereby inducing a current in the drill string resulting in the electromagnetic signature depicted in the figure. FIG. 2 shows a frequency spectrogram of the magnetometer signal of FIG. 1, evaluated with a slow time Fourier transform. These plots show that there is a physical process with a frequency that switches rapidly between about 3 Hz and 6 Hz.

Figure 3:
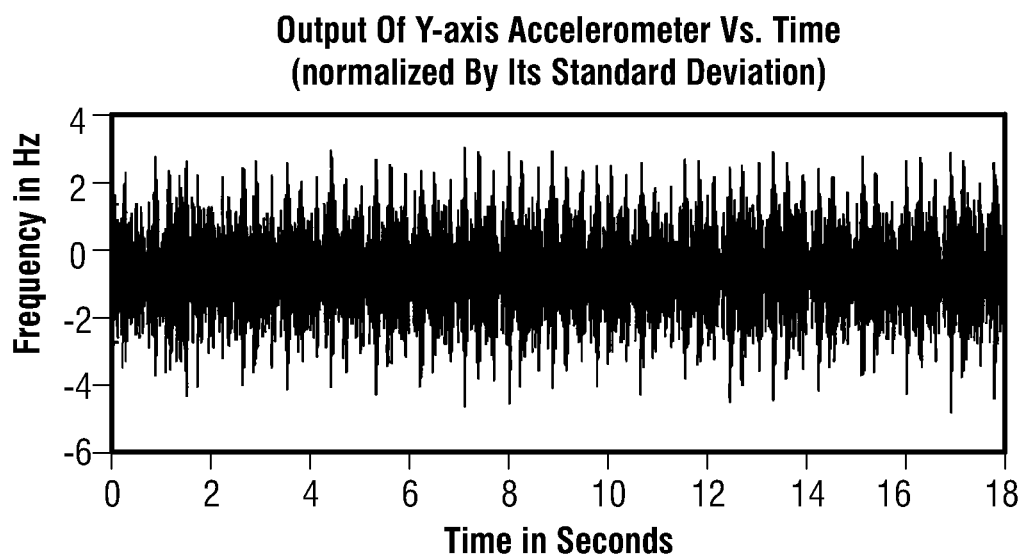
FIG. 3 shows the signal from an accelerometer mounted near the base of the derrick of a drilling rig.

The record of an accelerometer mounted near the base of the derrick of the rig is shown in FIG. 3. If this signal is examined in detail relative to the magnetometer output of FIG. 1, no correlation is immediately evident. However, spikes occur periodically in the accelerometer signal. These spikes occur with a mean frequency of 3.12 Hz, while the lower frequency component of the magnetometer signal has a measured average frequency of 3.14 Hz. It is reasonable to conclude that the same process that is responsible for the signal from the magnetometer is also responsible for the signal from the accelerometer. The rotary speed is not known, but half of this approximately 3 Hz frequency would be within the range of expected rotary speeds. In both of the signal transitions, the change in frequency is abrupt; which is typical of a system approaching chaos and thus is interpreted to be indicative of bit or collar whirl. Monitoring these conditions can facilitate identification of frequency doubling or bifurcation, which enables taking preventative action before the whirl fully sets in.

Second Example

Identifying Contact with the Casing

Figure 4:
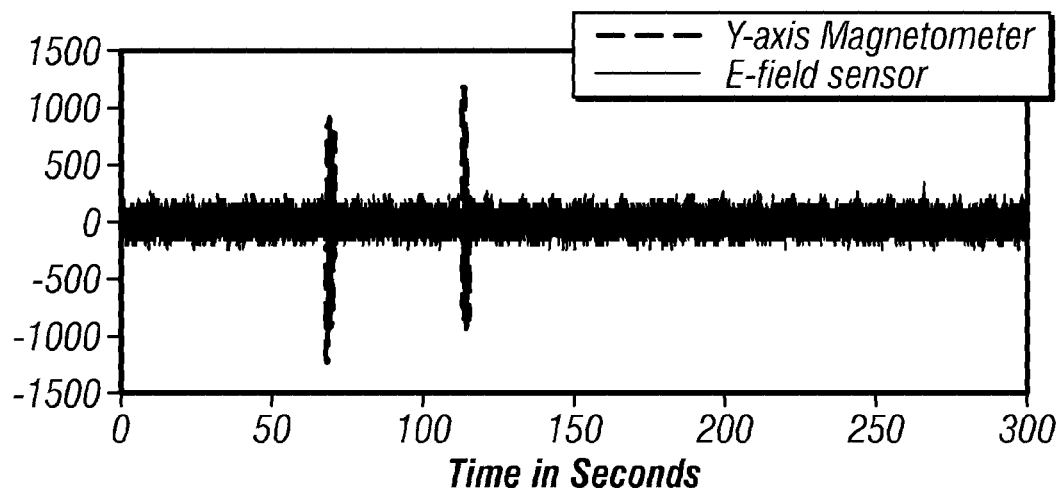
FIG. 4 shows the signals from a Y-axis magnetometer output mounted on the draw works of a drilling rig and from a background noise sensor that is an electric field sensor a short distance away from the drilling rig.
Figure 5:
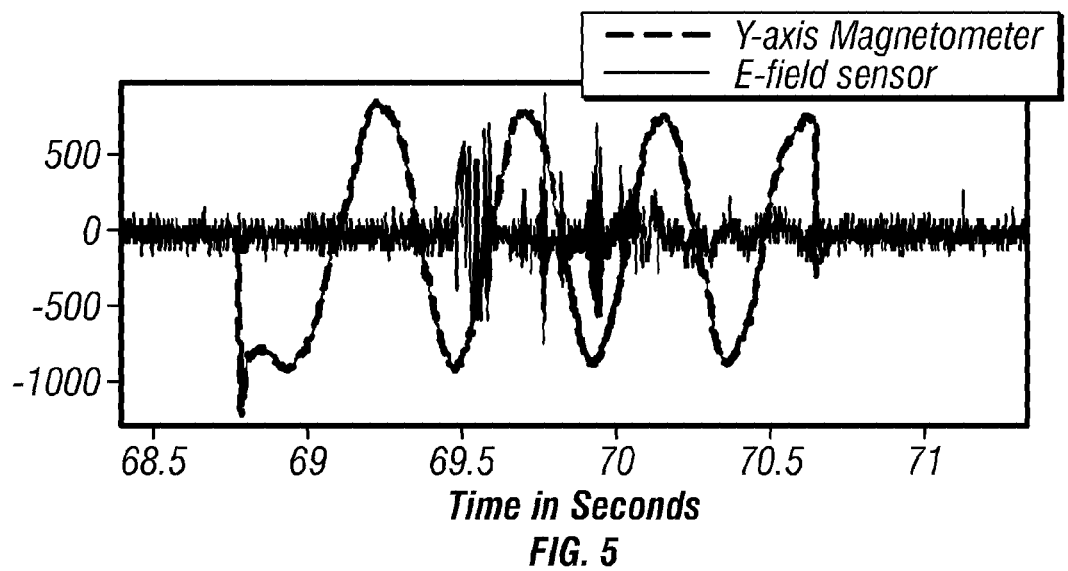
FIG. 5 shows the same signals as in FIG. 4 using an expanded time scale.

FIG. 4 compares the Y-axis magnetometer output (mounted on the draw works, as in FIG. 1) to that of a background noise sensor, here an electric field sensor a short distance away from the drilling rig. FIG. 5 depicts a portion of FIG. 4 over an expanded time scale. In FIG. 4, because of the time scale, it appears that there are two impulsive events in the magnetometer output and one impulsive event in the E-field sensor output. On the expanded scale of FIG. 5, the magnetometer output is seen as periodic during each of the events while the E-field sensor output is quite complex.

Figure 6:
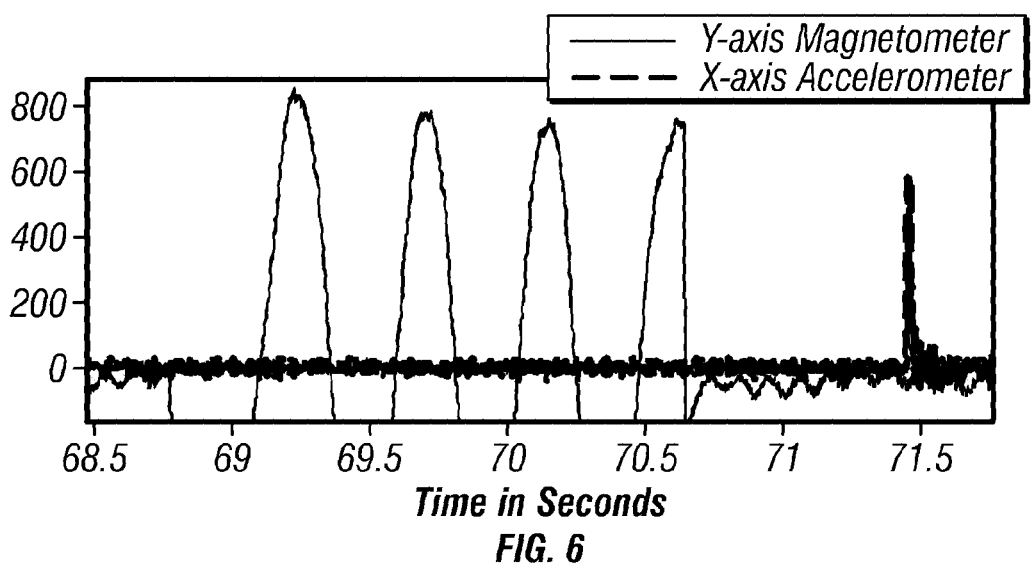
FIG. 6 shows the Y-axis magnetometer output of FIG. 4 plotted in comparison with the output of an X-axis accelerometer using a reduced time scale.

FIG. 6 shows the Y-axis magnetometer output plotted in comparison with output of the X-axis accelerometer (all three accelerometers were mounted at the base of the derrick). This is plotted on a reduced time scale in order to resolve the difference between the magnetometer and accelerometer events.

There were no other accelerometer events in the 300 second sample window in which this event occurred.

Figure 7:
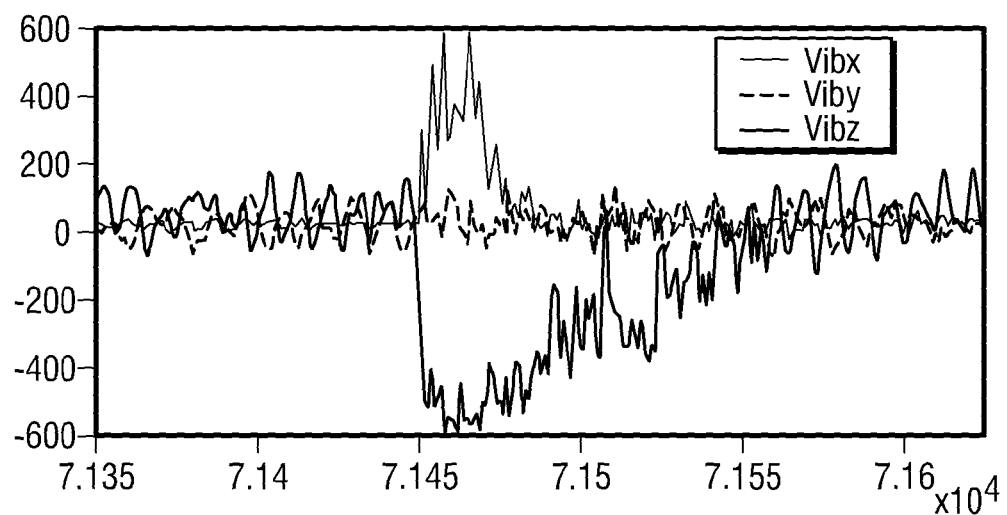
FIG. 7 shows the Y-axis magnetometer output of FIG. 4 plotted in comparison with other magnetometers.

FIG. 7 shows the outputs of all three of the accelerometers. These are delayed 2.78 seconds from the onset of the event in the Y-axis magnetometer and 0.78 seconds from the termination of the event in the Y-axis magnetometer. During the event centered around about 70 seconds, the magnetometer output goes through almost four cycles with a period of about 0.46 seconds. For the conditions of this test (highly resistive formation with oil base mud), it is likely that the drill string made contact with the casing. Under these circumstances, the casing would act as a brush with the rotating drill string acting as a rotating element in a generator (due to the presence of the earth's magnetic field). In this case, a current will be induced in the casing modulated according to the first time derivative of the rotation frequency of the drill string as well as any orbiting of the drill string around the inside of the casing. The initial contact between the pipe and casing would have launched a lateral wave, a torsional wave, or both, which could take several seconds to propagate up the drill string, depending on the tension in the drill string. An electric field would appear with the magnetic field, but would be considerably weaker.

Third Example

Discriminating Downhole Event from Rig Events

Figure 8:
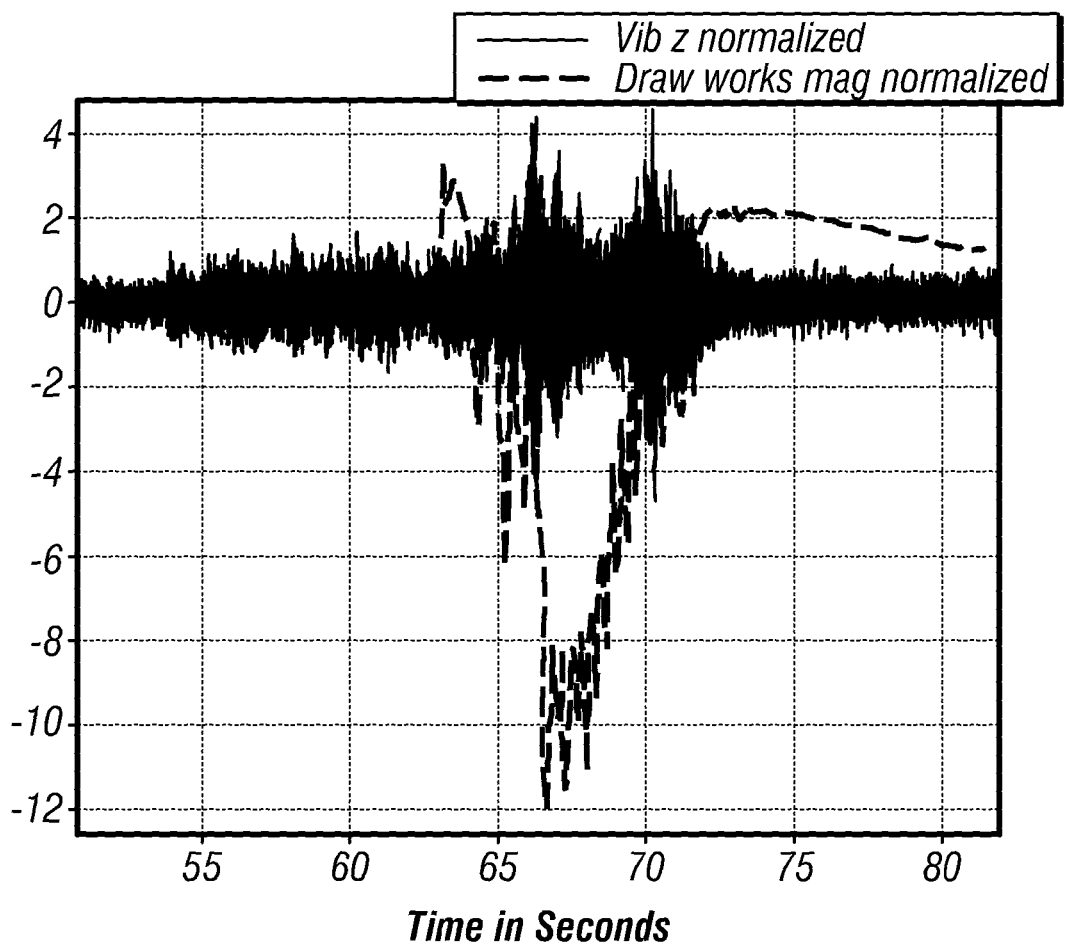
FIG. 8 shows the output of an accelerometer mounted on the derrick of a rig, and a magnetometer mounted on the draw works.
Figure 9:
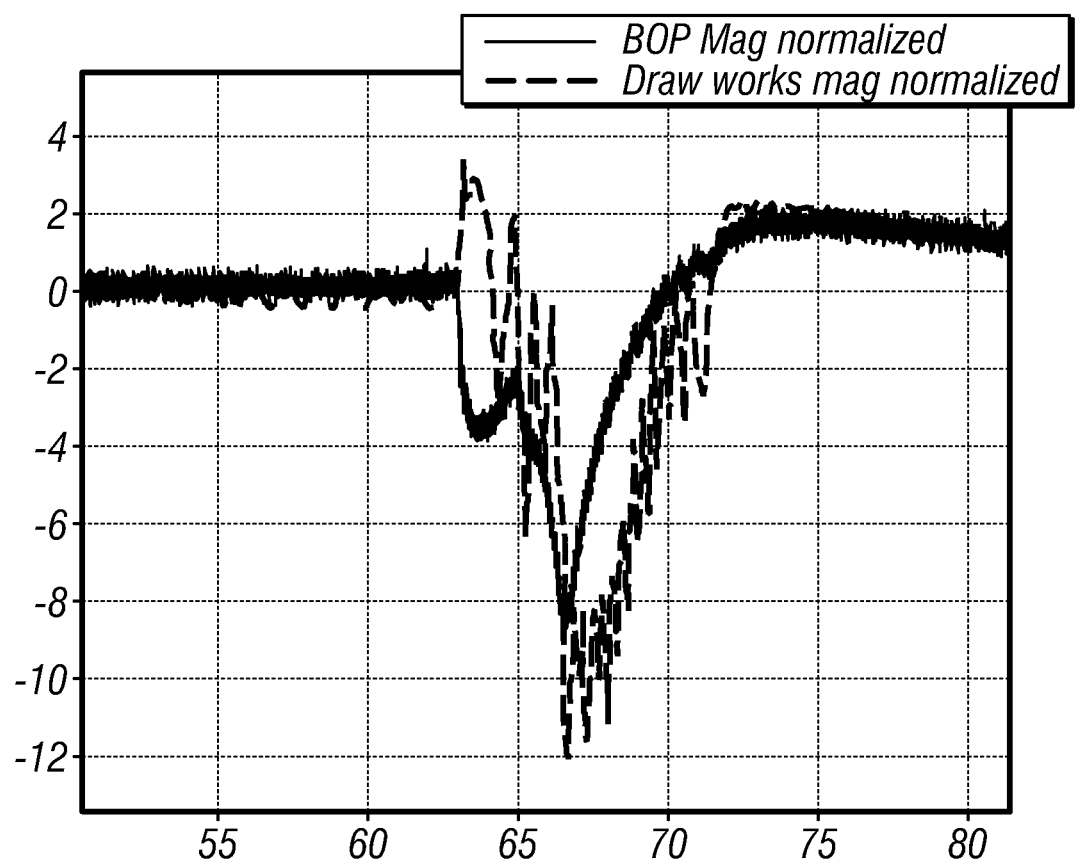
FIG. 9 shows the output of a magnetometer mounted on a blowout preventer, and the output of a magnetometer mounted on the draw works.

In this example, illustrated by FIGS. 8 and 9, there is shown to be a strong correlation between the output of an accelerometer mounted on the derrick of a rig, a magnetometer mounted on the draw works, and a magnetometer mounted on the BOP of the rig. FIG. 8 shows a plot of the signals from the first two sensors, normalized so as to be plotted on the same scale. At about 53 seconds, there is a small, sharp change in the magnetometer output. This is followed by a growing signal that breaks into an oscillation at a frequency close to 1 Hz. This is interrupted by a sharp transition at about 63 seconds, and another sharp transition at about 66.5 seconds followed by a slow decay that lasts until about 71.5 seconds. Between 66.5 and 70 seconds, the magnetometer output contains not only the approximately 1 Hz signal, but also has a harmonic of that signal. The onset of the phenomenon in the magnetometer trace is followed in a small fraction of a second by an increase in the accelerometer noise (which is all high frequency). The transitions in the magnetometer signal at around 66.5 and 70 seconds correspond to times at which the vibration noise bursts in intensity.

FIG. 9 shows the output of a magnetometer mounted on the BOP in comparison with the output of the magnetometer that was mounted on the draw works. The difference between the low frequency content of the BOP signal in comparison to the draw works signal is significant, as it indicates that the signal between these paths has been filtered.

It is apparent from FIGS. 8 and 9 that the three signals are clearly related. In this case, the high frequency content of the accelerometer noise and the close proximity in time of the accelerometer and magnetometer events indicates that this was due to some process on the drilling rig rather than downhole. Hence, it is possible to discriminate between downhole and surface events using the techniques described herein.

Analysis of the noise from the various sensors as described above can be used to diagnose a downhole condition (for example, whirl or casing contact). Additionally, through estimation of the speed of travel of the torsional wave through the drill pipe (in reference to measured or estimated weight on bit, as well as parameters of the drill string), in combination with a time reference derived from the arrival of an electrical or magnetic reference, one may determine, at least approximately, the location in the drill string of the event generating the signature.

Example Embodiments

In one example embodiment, a magnetometer on a drilling rig at an above-ground location such as the draw works of the drilling rig or a blowout preventer. A magnetometer signal is received from the magnetometer and then used to identify a mechanical event in a drill string of the drilling rig as indicated by a corresponding signature in the magnetometer signal. The signature in the magnetometer signal may be an abrupt increase in high frequency content and/or other features generated by the event such as an increase in high frequency content above a specified threshold. In the case where the event identified is drill collar whirl, the event may be identified from an approximate frequency doubling in the magnetometer signal. Preventative action may then be taken after identification of the whirl in order to prevent the whirl from fully setting in. In the case where the event identified is contact of the drill string with a casing of the well being drilled, the event may be identified from an impulsive event in the magnetometer signal that is approximately periodic on an expanded time scale and/or from an approximately periodic signal in the magnetometer signal that is found to correspond to a first time derivative of the rotation frequency of the drill string that may coincide with any orbiting of the drill string around the inside of the well casing.

In another example embodiment, a magnetometer is mounted on a drilling rig at a first above-ground location such as on the draw works of the drilling rig or on a blowout preventer. A mechanical sensor is mounted on the drilling rig at a second above-ground location such as on the derrick of the drilling rig. The mechanical sensor may be an accelerometer or may be a sensor for measuring displacement, velocity, force, torque, angular displacement, angular velocity, angular acceleration, stress, strain, or pressure. A magnetometer signal is received from the magnetometer, and a mechanical sensor signal is received from the mechanical sensor. An event in a drill string of the drilling rig is identified as indicated by corresponding signatures in the magnetometer and mechanical sensor signals. The signature generated by the event in the accelerometer signal may be an increase in high-frequency content. A determination is then made as to whether the event is a downhole event or a surface event based on the time separation between the signature in the magnetometer signal and the signature in the mechanical sensor signal. An approximate location in a drill string of the event may be determined from an estimation of the speed of travel of a torsional wave through the drill pipe of the drill string in combination with the time separation between the signatures.

From the descriptions above, it can be seen that various combinations of surface measurements may be applicable to different dynamic events affecting the drill string. In addition to the electromagnetic and mechanical measurements described herein, many other measurements may be used. For example, the term "mechanical measurements" as used herein is meant to include, at least any one or more of measurements of displacement, velocity, acceleration, force, torque, angular displacement, angular velocity, angular acceleration, stress, strain, or pressure. Also, additional surface measurements that may be useful in combination with, or in place of one or more of the above measurements, including such surface measurements as hook load, surface rpm, surface torque, standpipe pressure; as well as commonly available downhole measurements of weight on bit, bending on bit, downhole rpm, downhole pressure, etc.

It is useful to recognize that identification of the example drilling events described herein addresses processes distributed at any location along the entire drill string, rather than in just some specified location, such as may be obtained with direct sensing. Additionally, many other combinations or correlations of signals may be made than just the illustrative examples described herein.

The invention has been described in conjunction with the foregoing specific embodiments. It should be appreciated that those embodiments may also be combined in any manner considered to be advantageous. Also, many alternatives, variations, and modifications will be apparent to those of ordinary skill in the art. Other such alternatives, variations, and modifications are intended to fall within the scope of the following appended claims.

What is claimed is:

1. A method comprising:
   receiving a magnetometer signal from a magnetometer mounted on a drilling rig at an above-ground location, the magnetometer measuring a magnetic field produced by a current induced by a downhole mechanical event in a drill string of the drilling rig, wherein the current is not produced or modulated by downhole electronics; and
   identifying the downhole mechanical event as indicated by a corresponding signature in the magnetometer signal, wherein the signature in the magnetometer signal includes an increase in high frequency content.

2. The method of claim 1 wherein the event identified is drill collar whirl and further comprising identifying the event from an approximate frequency doubling in the magnetometer signal.

3. The method of claim 1 wherein the event identified is drill collar whirl and further comprising taking preventative action after identification of the whirl in order to prevent the whirl from fully setting in.

4. The method of claim 1 wherein the event identified is contact of the drill string with a casing of the well being drilled and further comprising identifying the event from an impulsive event in the magnetometer signal that is approximately periodic.

5. The method claim 1 wherein the event identified is contact of the drill string with a casing of the well being drilled and further comprising identifying the event from an approximately periodic signal in the magnetometer signal that is found to correspond to a first time derivative of the rotation frequency of the drill string that may coincide with any orbiting of the drill string around the inside of the well casing.

6. The method of claim 1 further comprising receiving the magnetometer signal from the magnetometer mounted on the draw works of the drilling rig.

7. The method of claim 1 further comprising receiving the magnetometer signal from the magnetometer mounted on a blowout preventer of the drilling rig.

8. A method comprising:
   receiving a magnetometer signal from a magnetometer mounted on a drilling rig at a first above-ground location;
   receiving a mechanical sensor signal from a mechanical sensor mounted on the drilling rig at a second above-ground location;
   identifying an event n a drill string of the drilling rig as indicated by corresponding signatures in the magnetometer and mechanical sensor signals; and
   determining whether the event is a downhole event or a surface event based on a separation time between the signature in the magnetometer signal and the signature in the mechanical sensor signal.

9. The method of claim 8 further comprising receiving the mechanical sensor signal from an accelerometer as the mechanical sensor.

10. The method of claim 8 further comprising receiving the mechanical sensor signal from a sensor for measuring displacement, velocity, force, torque, angular displacement, angular velocity, angular acceleration, stress, strain, or pressure as the mechanical sensor.

11. The method of claim 8 further comprising determining an approximate location in a drill string of the event from an estimation of a torsional wave travel speed through the drill pipe of the drill string in combination with the separation time between the signatures.

12. The method of claim 8 further comprising receiving the magnetometer signal from the magnetometer mounted on the draw works of the drilling rig.

13. The method of claim 8 further comprising receiving the magnetometer signal from the magnetometer mounted on a blowout preventer of the drilling rig.

14. The method of claim 8 further comprising receiving the mechanical sensor signal from an accelerometer mounted on the derrick of the drilling rig as the mechanical sensor.

15. The method of claim 8 wherein the mechanical sensor is an accelerometer and the signature in the mechanical sensor signal is an increase in high-frequency content, generated by the event.

* * * * *